July 15, 1947.                C. B. KING                2,423,892
                              TOOL HOLDER
                        Filed March 2, 1946              2 Sheets-Sheet 1
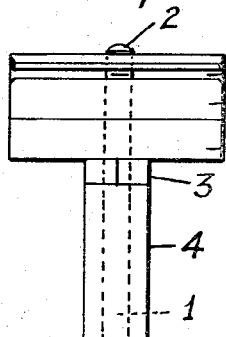
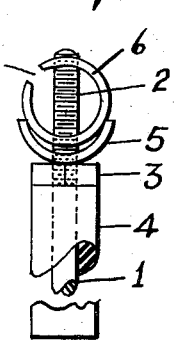
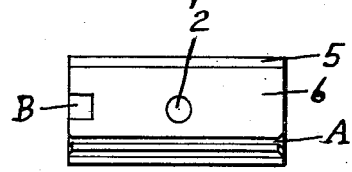
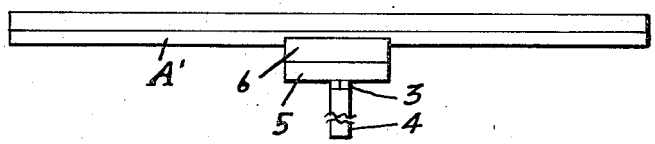
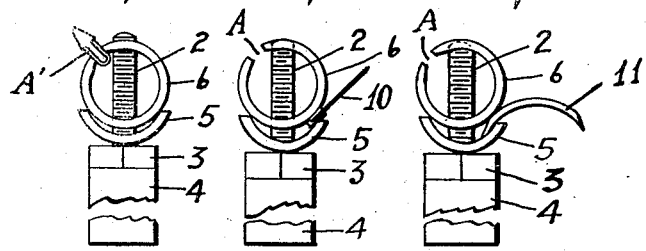
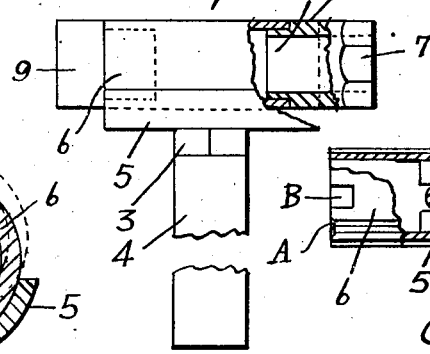
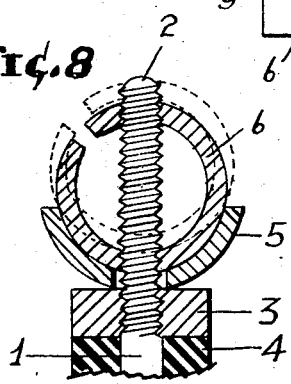
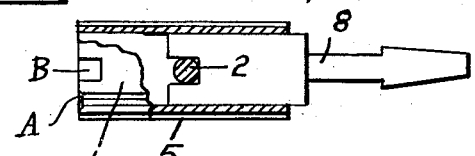
INVENTOR.
CARL B. KING
BY U. G. Charles
    Atty.

July 15, 1947.                C. B. KING                2,423,892
                              TOOL HOLDER
                    Filed March 2, 1946          2 Sheets-Sheet 2
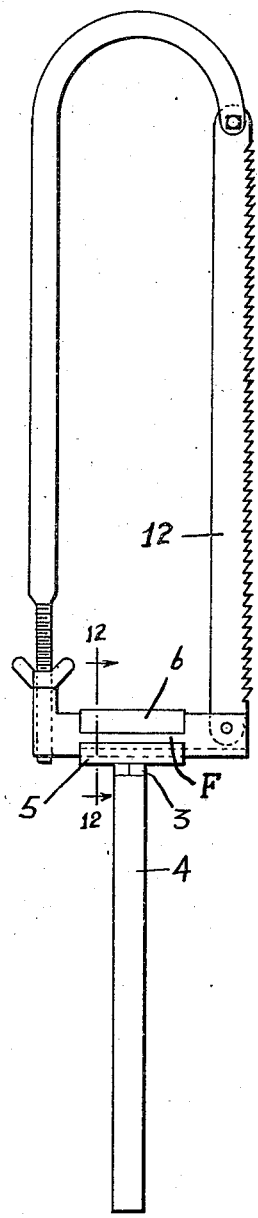
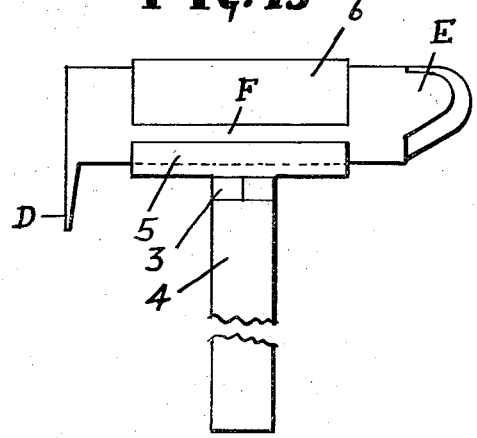
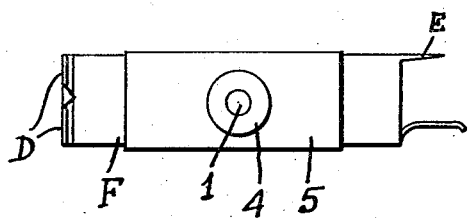
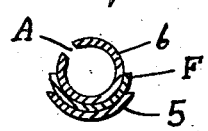
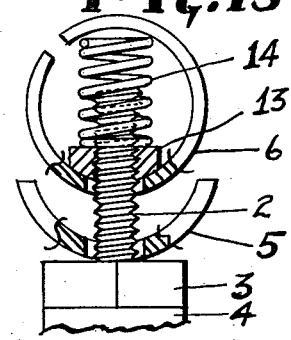
INVENTOR.
CARL B. KING.
BY U. G. Charles
        atty.

Patented July 15, 1947

2,423,892

UNITED STATES PATENT OFFICE 2,423,892

TOOLHOLDER

Carl B. King, Wichita, Kans.

Application March 2, 1946, Serial No. 651,561

2 Claims. (Cl. 306—29)

My invention relates to a tool holder, and has for its principal object a cylindrical jaw threadedly engaging on a handle and a sleeve sector loosely engaging on the handle and being clamped to engagement with the cylindrical portion, whereby articles of service may be clamped between the cylindrical and sector sleeve portions.

A further object of my invention is to provide a handle having a threaded portion and a shoulder at the termination of the threads as actuating means to force the sleeve sector to tight engagement with the cylindrical portion.

A still further object of my invention is to provide a hollow cylindrical portion that has a comparatively narrow portion removed that extends from end to end, whereby the confronting sides of the opening will function as jaws to receive blade-like structures therebetween.

A still further object of my invention is to construct a handle actuated clamping tool holder that will function as a twisting medium for spiral or for bending sheet metal, cylindrical in form, or to twist a metallic sheet.

A still further object is to construct an inexpensive holder for a variety of tools, and being efficient in its service.

These and other objects will hereinafter be more fully explained, reference being had to the accompanying drawings forming a part of this specification, and in which like characters will apply to like parts in the different views.

Referring to the drawings:

Fig. 1 is a side view of the tool.

Fig. 2 is a transverse view to that of Fig. 1, parts removed for convenience of illustration.

Fig. 3 is a plan view of the holder head.

Fig. 4 is a side view of one adaptation of the holder to a wiper blade.

Fig. 5 is an end view of Fig. 4.

Fig. 6 illustrates a safety razor blade for scraping as applied to the holder, while Fig. 7 is a similar view showing an arced blade carried by the holder.

Fig. 8 is an enlarged cross sectional view taken on a line through the center of the head with respect to its length, the threaded portion of the rod being in elevation.

Fig. 9 is a side view of the head adaptable to carry hammers and socket wrenches, partly in section and other parts removed for convenience of illustration.

Fig. 10 is a plan view of the head, partly in section and showing a screw-driver carried thereby.

Fig. 11 is a side view of the holder and a hacksaw carried thereby.

Fig. 12 is a sectional view taken on line 12—12 in Fig. 11.

Fig. 13 is a side view of the head having clamped therein a tool having a serviceable element on each end thereof.

Fig. 14 is a plan view of Fig. 13.

Fig. 15 is an end view of the holder modified, partly in section and parts removed for convenience of illustration.

As a more concise description of the holder, it will be seen that its component parts consist of a handle comprised of a rod 1 of suitable length and having one end threaded a spaced distance therealong as at 2, and a nut 3 engaging on the threaded portion and locked by forcing the same to the terminal of the threads, whereby a shoulder is formed. Said rod has preferably a rubber sleeve 4 secured thereon as a flexible and non-slipping means for the hand while working the holder.

It will be seen in Fig. 8 that a further component of the holder consists of a sector of a sleeve 5 that is apertured at its longitudinal center to loosely engage on the threaded portion and adapted to rest on the nut as a permanent seat therefor.

There is also provided a tubular member 6 to seat in the sector portion but having its bearing at the terminal edges of the sector inward thereof due to their varying diameters as shown in Fig. 2 and illustrated in Fig. 8 by dotted lines, said tubular member being bored and threaded diametrically and at its longitudinal center, to engage on said threaded portion of the rod. It will be seen that the shell of the tubular member is severed as at A from end to end to provide for a slight contraction for the purpose later described when tensioned by the threaded rod. Being so arranged the confronting sides of the opening will function as a clamp for the carrying portion of a tool, inserted therethrough as for example a wiper blade A as illustrated in Figs. 4 and 5. The contraction, above referred to, is due to the form of the sleeve sector which has its bearings on the tubular element along the sector's terminal edges, therefore as the tubular member is drawn inward by the threaded portion of the handle, the sector impounds its edge on the tube adjacent its opening causing that portion of the tube to spring sufficient to decrease the opening made by the severing of the tubular member, while the other edge of the sector counteracts to avoid rocking movement of the tubular member.

It will now be seen that a carrying member of a tool inserted therein can be firmly clamped as the space closely fits on the tool prior to clamping, consequently the movement is slight for a rigid engagement. To accomplish the above, it will be understood that the said members are made from spring steel, while the sector is highly tempered to avoid spreading when tension is applied.

It will be seen in Figs. 3, 9, and 10, that one end of the tubular member has a pair of notches B diametrically opposite each other and extending inward from one end a short distance whereby certain tools will have corresponding lugs to seat in the notches, for example, a socket wrench 7 as shown in Fig. 9 has a cylindrical shank 7' that is insertible within the tubular member while its lugs C will engage in the notches, and by contracting the tubular member by the threaded portion of the handle, the socket wrench is secured against removal. The same applies to a screw-driver 8 and a hammer element 9 as shown in Figs. 9 and 10 by contracting the tubular member the tools are secured as inserted in their respective ends of the tubular member, and other tools may have like shanks for similar engagement, and such other tools may be numerous but not shown in the drawings.

Another system of securing tools will be in the case of a scraper made from a safety razor blade 10, and an arcuate bladed tool 11, both of which are clamped between the cylindrical and sector elements and tightened in like manner to that above described, the position of which is illustrated in Figs. 6 and 7, and the said tool may be inserted to eject from either side of the sleeve sector, and adjustably secured.

It will also be seen that tools such as a hack saw 12 as illustrated in Fig. 11, and a combined claw D and box opening blade E that are carried by a body portion F as illustrated in Figs. 12 and 13, said body portion extending through the clamping holder, and in such cases, the longitudinal center of their engaging portion has an opening therethrough to receive the threaded portion of the handle rod extending therethrough to tension the sleeve sector to secure the tools firmly for engagement. Furthermore other tools may be made with a body portion similar to those described and adaptable to being secured in the clamping holder for their respective purposes, but such other tools not illustrated as the variety of tools is practically endless.

While I have shown that the bores through the cylindrical element are both threaded, the same may be modified by omitting the threads in the bore adjacent the sleeve sector to permit sliding movement, while the other bore being threaded is tensioning means to co-act with the sleeve sector to reduce or close the opening in the cylindrical portion's shell, and furthermore, the cylindrical element may be modified as shown in Fig. 15, wherein the upper aperture is eliminated while the lower aperture is unthreaded to engage freely on the threaded portion of the handle. To draw the cylindrical element toward the arcuate member is, through the medium of a nut 13, threadedly engaged on the threaded portion of the handle and positioned within the cylindrical element to contact its inner arcuate wall, whereby when the handle is turned, the nut will move the cylindrical element inward to clamp tools between said element and the arcuate member. It will be seen that a spring 14 is provided to retain the nut and cylindrical element in contact, said spring being positioned within the cylindrical element and on the nut whereby the nut will be restricted against turning within the cylindrical element, and furthermore the cylindrical element will be moved outward by the spring when the handle is being turned anti-clockwise to open the cylindrical element and said arcuate member. It will be understood that the nut is rectangular in contour with respect to its peripheral edge, while the side of the nut engaging the cylindrical element is made to conform to the cylindrical element as a means to restrict the nut from turning within the cylindrical element, and such other modifications may be made as lie within the scope of the appended claims.

Having fully described my invention what I claim as new and desire to secure by Letters Patent is:

1. In a tool holder, a tubular member being severed at one point from end to end, the shell of the tubular member being bored and threaded diametrically in spaced relation from the sever, a sector of a sleeve, the arc of which is of lesser radii so that the edges will contact the tubular member, a handle having a threaded portion on one end thereof of sufficient length to extend through the tubular member and the sector when the same are assembled in working relation, a shoulder formed on the handle and against which the sector will seat as a bearing to reduce the width of the opening and to cause tight engagement between the sector edges and external surface of the tubular member when the threaded handle is turned.

2. In a tool holder, a rod being threaded on one end for a spaced distance inward, a shoulder on the rod at the inner terminal of the threads, a rubber sleeve to cover the rod from its shoulder to the other end, a sleeve sector of suitable length and being bored intermediately of its ends to slidably engage on the threaded portion of the rod and seat on the shoulder, a cylindrical member equal in length to that of the sleeve sector, said cylindrical member being severed at one place from end to end and being bored and threaded diametrically in registry with the bore of the sleeve sector, said sector and cylindrical member being clamped tightly together whereby the severed opening is reduced with respect to its side edges as retaining means for tools, selectively, inserted within the tubular member, and between the tubular member and sleeve sector.

CARL B. KING.

REFERENCES CITED

The following references are of record in the file of this patent:

UNITED STATES PATENTS

| Number | Name | Date |
| --- | --- | --- |
| 605,752 | Shepard | June 14, 1898 |
| 1,321,549 | Pitton | Nov. 11, 1919 |
| 2,247,526 | Steinen | July 1, 1941 |